US010628559B2

United States Patent
Mowatt et al.

(10) Patent No.: US 10,628,559 B2
(45) Date of Patent: Apr. 21, 2020

(54) APPLICATION MANAGEMENT

(71) Applicant: Microsoft Technology Licensing, LLC, Redmond, WA (US)

(72) Inventors: David Mowatt, Dublin (IE); Phil Smail, Dublin (IE); Jeff James, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 871 days.

(21) Appl. No.: 14/747,612

(22) Filed: Jun. 23, 2015

(65) Prior Publication Data

US 2016/0379292 A1    Dec. 29, 2016

(51) Int. Cl.
*G06F 21/00*    (2013.01)
*G06F 21/10*    (2013.01)
(Continued)

(52) U.S. Cl.
CPC .......... *G06F 21/105* (2013.01); *G06F 3/0482* (2013.01); *G06F 8/60* (2013.01); *G06F 9/4451* (2013.01); *G06F 9/451* (2018.02); *G06Q 30/0631* (2013.01); *G06Q 30/0643* (2013.01); *G06Q 50/184* (2013.01)

(58) Field of Classification Search
CPC ..... G06Q 30/06; G06Q 30/0601–0641; H04N 21/4627; G06F 8/60; G06F 9/4451; G06F 9/451; G06F 3/0482
See application file for complete search history.

(56) References Cited

U.S. PATENT DOCUMENTS 7,818,262 B2 * 10/2010 Kavuri ............... G06F 21/10
                                                     705/52
7,840,490 B1 * 11/2010 Sellers ............... G06F 21/105
                                                     705/59
(Continued)

OTHER PUBLICATIONS

Wikipedia, Role-based access control, May 31, 2015, Wikipedia, pp. 1- 6 (Year: 2015).*

(Continued)

*Primary Examiner* — William J Allen
*Assistant Examiner* — Maria S. P. Heath
(74) *Attorney, Agent, or Firm* — International IP Law Group, PLLC

(57) ABSTRACT

The claimed subject matter includes techniques for application management including a managed application storefront module to return an access mechanism for a subset of purchasable applications to a storefront based on user information. An example system can also include a recording module to store usage information for the subset of purchasable applications accessed from the storefront. The usage information can include the user information, organization information, and an application version for each of the subset of purchasable applications accessed by the user. Another example system can include an administrative module to regulate access of the user, based on information recorded by the recording module, to a purchasable application of the subset of purchasable applications. In an example, this application management system, and its related techniques, can be used in ground up trial of applications by a large number of users, such as employees.

22 Claims, 6 Drawing Sheets

(51) Int. Cl.
*G06F 8/60* (2018.01)
*G06F 9/445* (2018.01)
*G06F 9/451* (2018.01)
*G06F 3/0482* (2013.01)
*G06Q 30/06* (2012.01)
*G06Q 50/18* (2012.01)

(56) References Cited

U.S. PATENT DOCUMENTS

| | | | |
|---|---|---|---|
| 8,725,124 | B2 | 5/2014 | Toy et al. |
| 8,731,529 | B2 | 5/2014 | Lindeman et al. |
| 2007/0143228 | A1* | 6/2007 | Jorden .................... G06F 21/10 705/71 |
| 2009/0037287 | A1* | 2/2009 | Baitalmal ............. G06F 21/128 705/27.1 |
| 2011/0252415 | A1* | 10/2011 | Ricci ..................... G06Q 10/06 717/173 |
| 2011/0289003 | A1 | 11/2011 | Womack et al. |
| 2012/0131470 | A1 | 5/2012 | Wessling et al. |
| 2012/0323898 | A1 | 12/2012 | Kumar et al. |
| 2013/0144633 | A1 | 6/2013 | Guadarrama et al. |
| 2013/0144755 | A1 | 6/2013 | Mowatt et al. |
| 2014/0053234 | A1 | 2/2014 | Barton et al. |
| 2014/0208266 | A1* | 7/2014 | Desai .................... G06F 3/0482 715/810 |
| 2014/0236846 | A1 | 8/2014 | Melika et al. |
| 2014/0283092 | A1 | 9/2014 | Mowatt et al. |
| 2014/0316990 | A1* | 10/2014 | Winston ................ G06F 9/4411 705/44 |
| 2014/0365384 | A1 | 12/2014 | Mowatt et al. |
| 2015/0106500 | A1* | 4/2015 | Fakhouri ................ H04L 67/34 709/224 |
| 2016/0314447 | A1* | 10/2016 | Trevathan .......... G06Q 30/0609 |

OTHER PUBLICATIONS

"International Search Report and Written Opinion Issued in PCT Application No. PCT/US2016/038596", dated Oct. 10, 2016, 10 Pages.

"Matrix42 Compliance", Retrieved on: Mar. 23, 2015, Available at: https://www.matrix42.com/en/products/matrix42-compliance/.

"AirWatch Mobile Application Management", Retrieved on: Mar. 23, 2015, Available at: http://www.air-watch.com/solutions/mobile-application-management/.

"Software Metering, Software Compliance and Software License Management", Published on: Mar. 10, 2009, Available at: https://www.manageengine.com/products/desktop-central/software-inventory.html.

* cited by examiner

APPLICATION MANAGEMENT

BACKGROUND

Computer applications are available to be downloaded or purchased from a variety of sources including online stores, repositories, or databases. Users of applications, including companies, can purchase licenses to use the applications. Often, companies will assign administrators and other delegated professionals to select, purchase, and deploy the selected application for use by its many employees.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

The present disclosure generally regards an application management system including a managed application storefront module to return access link, use buttons, a launching mechanism such as a download link like a uniform resource locator (URL) for a subset of purchasable applications to a storefront based on user information. An example system can also include a recording module to store usage information for the subset of purchasable applications accessed from the storefront. The usage information can be associated with the user information, organization information, and an application version for each of the subset of purchasable applications accessed by the user. The usage information can include not only downloading, launching, or accessing of an application, but also the interactivity of a user with the application, the recency and frequency of use, and any other suitable statistic indicating a user's use of an application. Another example system can include an administrative module to regulate access of the user, based on information recorded by the recording module, to a purchasable application of the subset of purchasable applications accessed by the user.

The present disclosure also regards a method for application management including returning data for a subset of purchasable applications to a storefront based on user information. An example method further includes storing usage information, with a recording module, corresponding to the subset of purchasable applications accessed or launched from the storefront, the usage information including the user information, organization information, and an application version for each of the subset of purchasable applications accessed by the user.

The disclosure further regards a tangible, computer-readable medium for application management that will return, with a managed application storefront module, an access mechanism to a storefront based on user information, an access mechanism to indicate the means for accessing data for a subset of purchasable applications. The computer-readable medium can also store usage information, with a recording module, accesses from the storefront, the usage information including the user information, organization information, and an application version of each of the subset of purchasable applications access by the user. The computer-readable medium can also regulate access, with an administrative module, to a purchasable application of the subset of purchasable applications based on information recorded by the recording module, the access regulated by the administrative module no longer returning an access mechanism for the purchasable application to the storefront.

DETAILED DESCRIPTION

Figure 1:
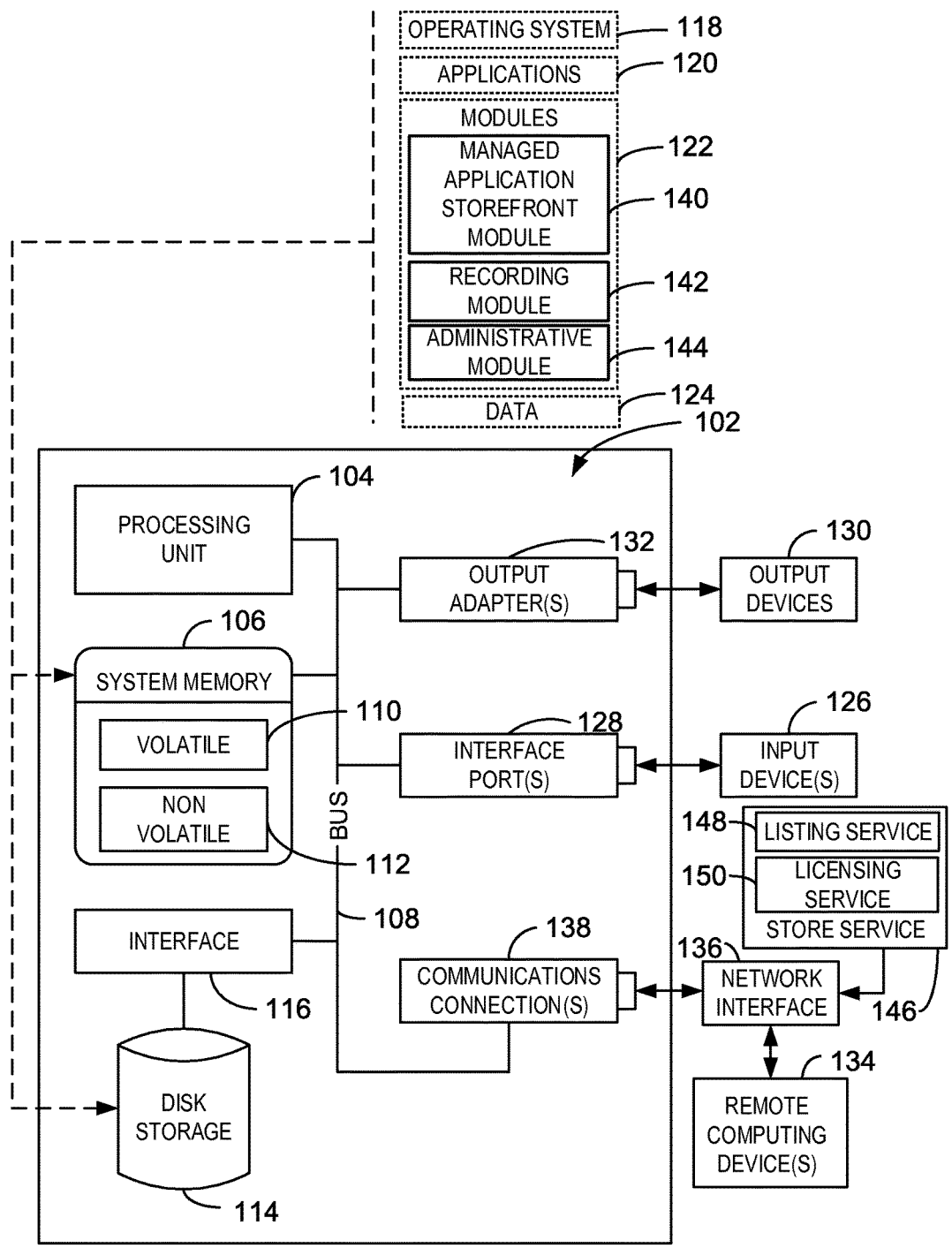
FIG. 1 is a block diagram of an example operating environment configured for implementing various aspects of the techniques described herein.

Current deployments of applications require either a decision by the individual to buy the application, or a top down management purchase of a large number of licenses to an application for all employees and devices within an organization. The present disclosure provides a means for management and trial of applications based on user usage statistics, which can indicate specific applications for which a user should be granted access.

The present disclosure regards the acquisition, management, and access control of third party or purchasable applications, which may in some computing environments cause information technology (IT) security concerns. Examples of IT concerns can include an application not representing the target value for a set cost to the organization, a desire for alignment of purchasing decisions around a preferred vendor, or ensuring applications meet certain compliance, security or data protection requirements of an organization. Accordingly, the present disclosure provides techniques for managing access to purchasable applications by any suitable number of users in a way that still allows users within that organization to discover applications the IT department had not previously considered, used, or implemented. In some embodiments, access to purchasable applications is controlled in part by allowing usage trial versions of purchasable applications with a centralized module to track the number of downloads, usage, and other relevant information of each purchasable application. In some examples, a module can also approve of further access, allow access to a full version of the purchasable application, and cease access to the purchasable application based on user information gathered, as well as on previous decisions made by the central administrator.

The techniques disclosed herein can include an application management system that allows users to use, access, and freely launch applications from an application store. The application management system can observe and store the statistics such as a number of users who have used or accessed an application as well as each user's usage of the application. With this information, the application manager can automatically allow access, deploy, block, or otherwise manage the user's access of the application. To aid in this user-first application deployment technique, a prioritized list used by a centralized administrator module reports which third party applications are being used across the organization. As part of this list, it is reported whether the application is a trial version, a full version, and whether the vendor of the application is already approved by the organization using and therefor may register as trusted.

In some instances, the ability for an application management system to approve full access, either automatically or manually, to an application can be based in part on user information such as a user's position, a user's organization, and any other suitable information indicating a user's ability to approve full access to an application. An organization can include the scope of users and devices managed by the application management system. A subset of the organization can be referred to as a division and can include separate permissions, administrators, and more granular information about application usage, download, and information for users and application within that division. In one example, users of an organization can be grouped by division or belong to multiple divisions to be automatically managed by one or more users of an application management system operating with some division based control.

Data gathered through the presently disclosed technique can allow an application management system to receive statistics regarding how many users are using a particular application accessed from an application storefront, and how often. This data can aid the application management system in most effectively granting access.

In an organization, a user can be listed in a directory that supports user, e.g. employee, sign-in through personal credentials. These user profiles can also include permissions, i.e. roles associated with each user. In the context of this disclosure, the users can gain authorization to provide an application management system with an access control role, an individual access control role, or any other suitable role associated with the application management system's ability to affect access to users through the licenses of purchasable applications.

To complement these techniques, a feedback mechanism can be implemented. In an example, the user can receive a notification that a trial period is ending and may send a request to their organization administrator module to fully access the application. This request can be charged against a particular administrator's assigned resources as indicated by data received at the administrator module including cost data, hardware capability data, or any other limiting resource associated with the application requested. In another example, multiple divisions can be assigned formal application access limits and application access can be approved automatically with certain settings by an administrative module, or if a user with a particular departmental or organizational accesses control. In some examples, the administrator module can remove the ability for users to use other similar applications if a preferred application is sourced.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware can include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like can refer to computer-related entities, hardware, and software in execution, firmware, or combination thereof. A component can be a process running on a processor, an object, an executable, a program, a function, a subroutine, a computer, or a combination of software and hardware. The term, "processor," can refer to a hardware component, such as a processing unit of a computer system.

Furthermore, the claimed subject matter can be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, can include communication media such as transmission media for wireless signals and the like.

FIG. 1 is intended to provide a brief, general description of a computing environment in which the various techniques described herein may be implemented. For example, a method and system for application management can be implemented in such a computing environment. While the claimed subject matter has been described above in the general context of systems, devices, and methods, the claimed subject matter also may be implemented in combination with other program modules. Generally, program modules include routines, programs, components, data structures, or the like that perform particular tasks or implement particular abstract data types.

FIG. 1 is a block diagram of an example operating environment configured for implementing various aspects of the techniques described herein. The example operating environment 100 includes a computer 102. The computer 102 includes a processing unit 104, a system memory 106, and a system bus 108.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-212 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the claimed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102, and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices can provide both input and output capabilities such as remote computers 134.

The computer 102 can be a server hosting various software applications in a networked environment using logical connections to one or more remote computers, such as remote computers 134. The remote computers 134 may be client systems configured with web browsers, PC applications, mobile phone applications, and the like.

The remote computers 134 can be a personal computer, a server, a router, a network PC, a workstation, a microprocessor based appliance, a mobile phone, a peer device or other common network node and the like, and typically includes many or all of the elements described relative to the computer 102.

Remote computers 134 can be logically connected to the computer 102 through a network interface 136 and then connected via a communication connection 138, which may be wireless.

Network interface 136 encompasses communication networks such as local-area networks (LAN) and wide-area networks (WAN), as well as wireless local-area networks (WLAN) and wireless wide-area networks (WWAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). WLAN technologies include Wi-Fi (802.11), Bluetooth, and similar protocols while WWAN technologies can include long-term evolution (LTE), universal mobile telecommunications system (UMTS), and other similar protocols.

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

An example processing unit 104 for the server may be a computing cluster. The disk storage 114 may include an enterprise data storage system, for example, holding thousands of impressions.

The computer 102 can be configured as an application manager. In this configuration the computer 102 can include modules 122 such as a managed application storefront module 140, a recording module 142, and an administrative module 144.

The managed application storefront module 140 can interface with disk storage 114, system memory 106, or other remote computing devices 134 to request and return user information about purchasable applications that the user may access. The managed application storefront module 140 may regulate the purchasable applications presented to the user by restricting the hardware or software capabilities and compatibilities of the device or computing environment of the user. In other examples, a policy or setting can be implemented on a managed application storefront module 140 to allow a deployment wide limitation on certain applications being available to a user for download, launching, or access. In one example, a policy may choose to limit the sending of application info for applications that have already been launched, downloaded, or accessed by the user as well as all other applications with the same capabilities and function to ensure uniformity and compliance across a deployment of this technique. A further policy may include blocking of certain vendors from selected from a user device. An indication of an application's availability can be displayed by an annotation as to a certification of the application based on certification data. In an example, the administrative module 144 may only allow display of application that include certification data for a certain certification.

The recording module 142 can store information received at the computer 102 about application usage statistics to be sent to a database. Additionally, the recording module 142 can store user identifying information, user division affiliations, application usage by all monitored users, version of the application, and other similar information about applications and their use by users and divisions within an organization. This information can be used by the computer as well as all other modules aiding in the deployment of this technology. In an example, the usage information recorded by the recording module 142 can aid an administrator in determining which application to access as it might benefit similar users who are not currently using the application. The metadata about the application from a store listing service can further provide deeper information about the application. For example, this metatdata can include information about an applications capability, certifications, and a contact information for the vendor of the application. In an example, the usage information can include any information associated with the usage of the application including download times, usage times, information related to users and user devices accessing and operating the application, or any other suitable usage information.

The administrative module 144 can regulate user access to the purchasable applications that are accessed based on information detected and recorded by the recording module 142. In an example, if the administrative module 144 receives data from the recording module 142 about a preference of a division, the administrative module 144 can enforce that preference on a purchasable application accessed or launched by the user. This implementation can involve administrative module 144 approving purchases automatically or manually based on notification data received from an input device.

If a purchase is automatically rejected, or if the input signal for a purchase is not made, the administrative module 144 can send a message back to the input device to request additional input. In an example, the administrative module can also block future deployment if it is determined that the application was automatically invalid, for example, for lacking organizational permission. For example, a division within an organization can prefer only a particular brand of application or only one type of word processing application, and will permit that application or brand to be accessed or launched and implemented by a user, in another example. In these cases, the administrative module 144 can notify a user of the noncompliance with organizational and divisional guidelines, the administrative module 144 can access and return an access mechanism of a particular application. Additionally, the administrative module 144 can also cease payments to a vendor for a purchasable application. In one example, the managed application storefront 140 can identify applications in the store while excluding applications that are not approved for use in a particular deployment.

The computer 102 can be configured to network with a store service 146 through the network interface 136. The store service 146 can hosts any available application through storage of the application data. The application data in a store service 146 can be updated on a periodic basis, as frequently as needed, for example daily. The store service 146 can also store any metadata associated with the applications the store service 146 may be storing. This application metadata can include information about each application including authorship, size information, pricing of the application, and ownership information of the application. In an example, this metadata can be updated or altered based on instructions received at the store service 146.

In an example, a store service 146 can store many applications and filtering logic saved in the managed application storefront module 140 can reduce the display or loading of every application to a subset of the total amount in the store service 146. The listing and serving of these applications can be accomplished by a listing service 148. In an example, this limitation reduces the data that is transmitted to each organization's application module, or computer 102. In part this limiting of transmitted data is done through simply not transmitting certain application data or application metadata, but updates to each of those types of data are also included in the reduction of data being pushed to each computer 102.

The licensing and service of ownership data for stored applications can be accomplished by a licensing service 150 within the store service 146. In an example, the store service 146 is wholly separate from the managed application module, or computer 102 to increase the security of the licensing service through the separation of isolation of licensing data.

Figure 2:
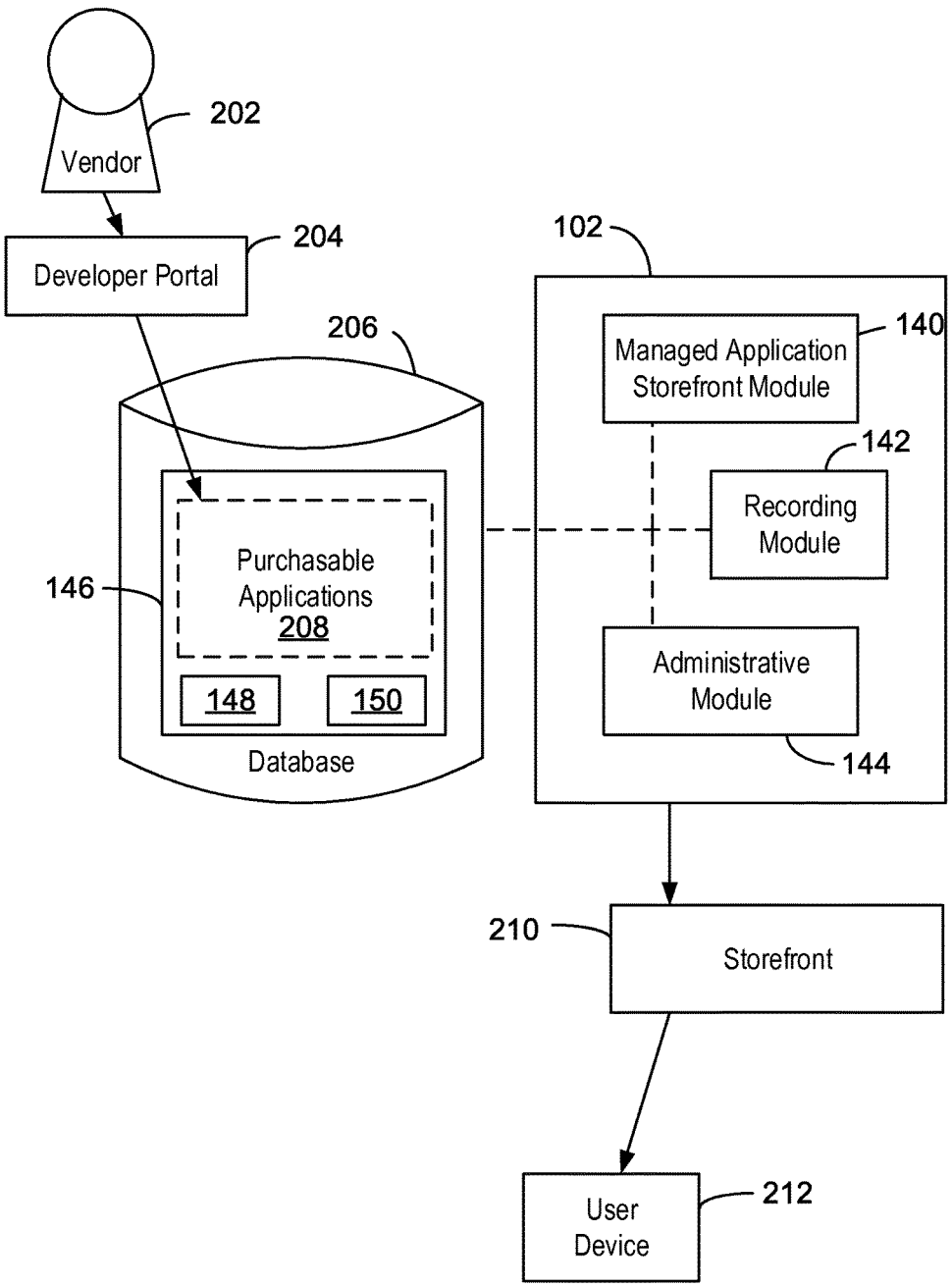
FIG. 2 is an example of an application management system presenting a storefront to a user.

FIG. 2 is an example of an application management system presenting a storefront to a user. The example system is generally referred to by the reference number 200. Like numbered items are as described in FIG. 1.

In example system 200 a vendor 202 can connect via a developer portal 204 to a database 206. The developer portal can be a website, or other data submitting platform usable to submit an application to the database 206. The developer portal can act as a vendor gate, acting to approve or disapprove based on, for example, tax-clearance, fee payment for inclusion in the database, or other suitable qualification for uploading of an application to the database. In an example, the vendor 202 can submit purchasable applications 208 for use, sale, licensing, and other similar reasons. A vendor 202 can be a third party developer of software applications without formal credentials or affiliation with a particular company, deployment, or system. While all purchasable applications 208 can be stored in a database 206, not all purchasable applications 208 may be displayed in a storefront 210 to a user device 212. Further, from their name, purchasable applications 208 imply that money is changing hands. However, in some examples, applications can be made available that do not require purchasing, as their purchase price is 'free' or they involve 'in-app purchases.' This example makes it clear that an interest in this disclosure is to allow an information technology can ensure that when users start discovering and using interesting purchasable applications to get something done, the IT department can ensure that the same application gets used by everyone. For example, if a user discovers syncable cloud file storage system add-in and uses it for 30 days, the same system discussed in this disclosure can be used by IT can allow even though no fee is paid. In some examples, IT's role includes ensuring vendor services are trustworthy, rather than IT in this case needing to make a purchase decision on a case by case, or even division, or organization basis.

In the example system 200, the purchasable applications may have particular characteristics, such as a lack of operability on a particular hardware or firmware. Accordingly, the managed application storefront module 140 can reduce the number of purchasable applications shown to a user device 212 if, for example, the purchasable application may not be compatible with the device of the user device 212. Further, as the database 206 can also store the metadata of purchasable applications 208, which can indicate whether a particular purchasable application 208 carries certain certification, support, or is from a particular vendor 202 that is known to a user. Additional situations can be present to adjust the number and type of applications present in the storefront based on information stored in the recording module 142 such as user ID, and number of other users who are actively using the product.

In an example, while a store service 146 in the database 206 can contain a listing service 148 with a list of the entirety of purchasable applications 208 or link data, a filtered storefront 210 is provided to the user device 212. In an example, the storefront 210 can provide a browsing experience that includes applications supported by user device 212 systems and tasks associated with a user's 212 role. The user device 212 may see a full list of applications or a filtered list of applications as some applications may be excluded based on compatibility or based on instructions detected from an administrative module such as the administrative module 144 of FIG. 1. In some embodiments, the instructions from the administrative module 144 can be generated from a user device 212 with a power role to adjust the applications employees can use, launch, or access. In one example, user access to social applications may be blocked, or applications made by an organization's competitors may be blocked.

In an example, a recording module 142 receives and records usage information. The recording module 142 can also be used to receive and match license information generated by or received from a licensing service 150. A recording module can also receive and store information including user information. The licensing information received from the licensing service 150 can be used by the managed application storefront module 140 to adjust the applications accessible or even shown in the storefront 210 or the user device 212. In an example, the user may have already accessed a trial version of an application, and this information could be used by the managed application storefront module 140 to no longer return a trial version option for that application. Alternatively, if user information received at the recording module 142 indicates that the user device 212 is not authorized to access an application, an unauthorized application may not be shown in the storefront 210 and instead only trial versions of applications may be presented to the user device 212 by the managed application storefront module 140. In an example, a trial period for an application has expired for a user device 212 and this user information, stored in the recording module 142, allows the managed application storefront module 140 to return only the data for applications with a trial period remaining.

In an example, the application storefront module 140 can enable the access, usage, or launching of an application based on certain conditions. For example, the application storefront module 140 can enable the launching, downloading, or accessing of an application if a trial version is available and the application supports tasks performed by a user device 212. Once a trial period begins for a purchasable application, the trial license status for the purchasable application is recorded along with the corresponding user that initiated the trial period of the purchasable application and the user's division information. In some examples, this can be stored by the licensing service 150 with data needed by the managed application storefront module 140 or administrative module 144 being received and recorded on the recording module 142.

Figure 3:
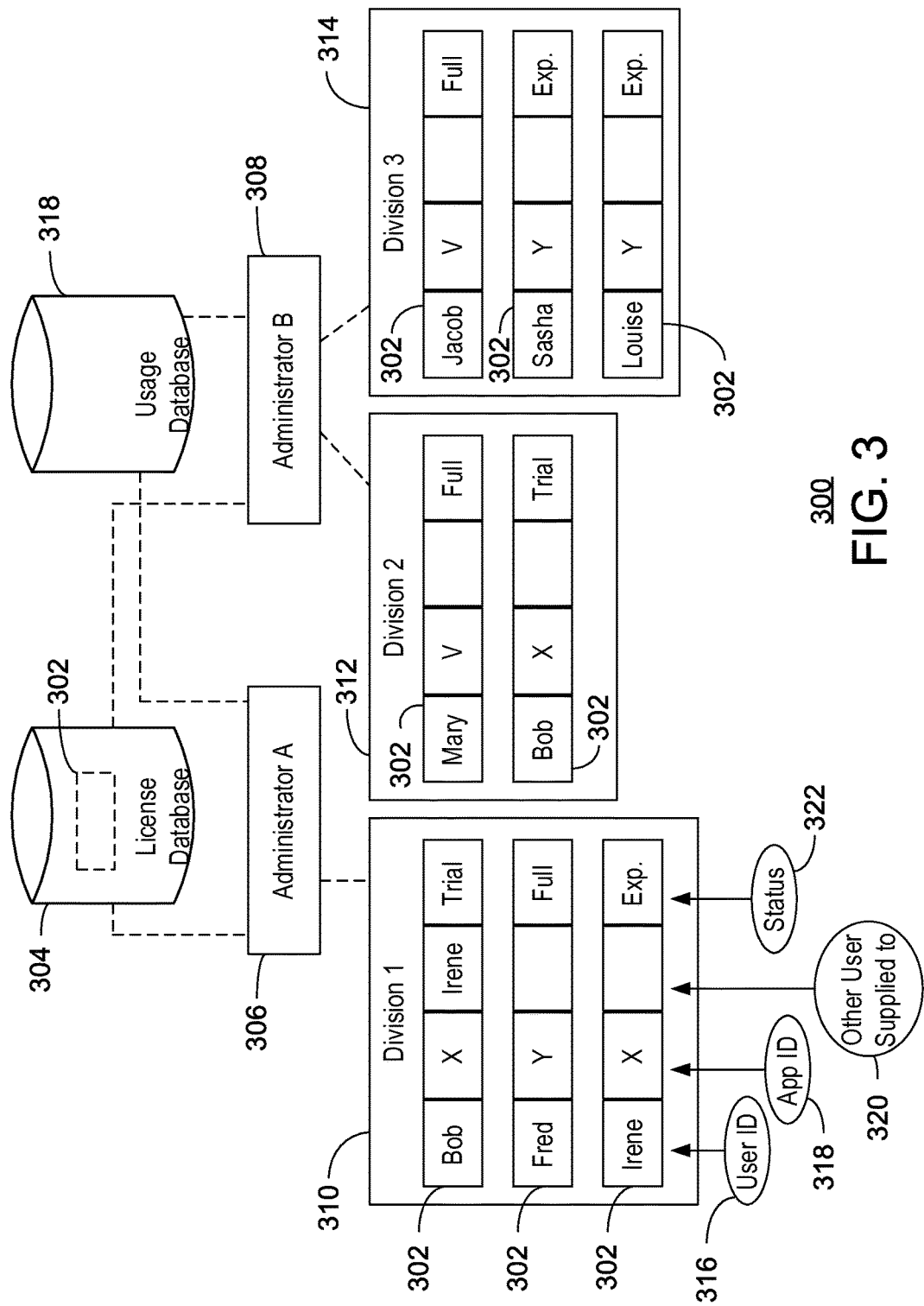
FIG. 3 is an example system of application management including grouping within an organization by division.

FIG. 3 is an example system of application management including grouping within an organization by division. The example system is generally referred to by the reference number 300.

The data for a license 302 to use an application can be stored in a license database 304 or licensing service 150. As used here, license broadly includes trial period licensing to use an application, partial version licensing, full versioning, premium versioning, or an indication of expiration or prohibition of use. The license database 304 can be stored in disk storage 114, system memory 106, a remote computing device 134, or any other suitable medium.

The license database 304 can include the store service 146 to manage access and by an administrator with proper credentials and payment information. Each administrator, administrator A 306 and administrator B 308, can be a computer 102 that includes an application manager, which may have access restricted to users with a power role assignment. In an example, each administrator, administrator A 306 and administrator B 308, can also be a policy or automated management system using the techniques of an application manager to control, route, store, and otherwise handle license and usage data from user devices 212.

The management of licenses 302 can involve detecting divisions within an organization, including division 1 310, division 2 312, and division 3 314, each based on user and division information. Although division 1 310, division 2 312, and division 3 314, are each shown associated with different licenses 302 and user devices 212, for purpose of discussion here, the traits and function of division 1 310 can equally apply to division 2 312 and division 3 314 unless otherwise indicated. Division 1 310 can be stored by a recording module 142 and can indicate a user is associated with that division. Each user device 212 can be designated to any suitable number of divisions 310-314. Each Division 1 310 can be used by an administrative module 144 to divide user device 212 and license 302 management between either administrator, administrator A 306 or administrator B 308. In one example, a different administrator, administrator A 306 or administrator B 308 can be assigned to any suitable number of divisions 310-314. Managing a division 1 310 can include obtaining and storing user information, license information, policy and management information, usage data, and any other suitable data for application management data.

The data for each license 302 can include an organization ID of a particular organization, division ID for each division 310-314 if needed, user identification (user ID) 316, an application identification (app ID) 318, an indication 320 of additional users which have received the application from user device 212, and a status 322 of the licensing state of an application. Some of this information may or may not be included in a license 302 managed by application manager technology. Additionally, other information can be included in a license 302 to be managed by application manager technology.

The application identification 318 can be used to determine if and how, for example, "Bob" has used, accessed, and launched "X" application. For example, information can be gathered as to the frequency and recency of application usage. In some examples, usage is not as simple as launching an application, but also information on if a user device has received input indicating interaction with an application. In an example, this usage information is used to track interaction with a newsfeed widget inside an encasing or platform application. In this way, the actual use of applications and widgets can be measured rather than just an indication of if the application was launched.

In the illustrated example, the status 322 of Bob's license to use "X" application is "trial" indicating a trial version. In an example, additional related data can be included in license 302 information including an expiration date of a license. An indication 320 of other user devices a first user device 212, e.g. Bob, has supplied or shared the application with can include any number of user devices, e.g. "Irene", who have received this application from a first user device. This indication can be used by either administrator, administrator A 306 or administrator B 308, in determining the spread, usefulness, adoption, rates, and types of users that may find a particular application useful.

In an example, either administrator, administrator A 306 or administrator B 308 can collect usage data from applications accessed or launched on a user device 212. The usage data or usage reports stored in a usage database 318 can be filtered by division similar to the grouping of user devices 212 into divisions 310-314. In an example, an administrator A 306 can obtain data from a usage database 318 indicating that trial versions of applications are used frequently. Administrator A 306 can then access, either automatically or manually, licenses for a number of users who have shown frequent use of a trial version of an application. Other usage statistics, license statuses, user devices 212, and divisions 310-314 can be managed differently depending on the situation and application. In an example, administrator B 308 detects that an application "Y" has an "expired" status for many user devices 212 of a Division 3 314. Administrator B 308 can block access to application "Y" and prevent any initiation of payment to a vendor 202 or cease payment if payment and licensing had already begun. This blocking of access and prevention of payment can be for the license 302 of application "Y" for a user 202, Division 1 310, or entire deployment under management of each administrator, administrator A 306 and administrator B 308.

In an example, usage data stored in a usage database 318 can include the usage information of multiple user devices 212 in a Division 1 310 using a varied number of purchasable applications 208, some of which are not fully accessed or still in trial mode. In some cases, the use of trial versions of purchasable applications may be discontinued by user device 212. In another example, use of trial versions can be tied to a user ID 316, divisional ID of a division 310-314, or any other suitable identification measure. In this example, no matter the device that an application is running on, the access and usage is limited by an appropriate identifier to ensure proper licensing and compliance with licensing. In some examples, the usage database 318 can indicate extensive use of a purchasable application by user devices 212 or divisions 310-314 during a trial period. As indicated above, usage is more than simply launching an application and can include any variation of typical application usage measurement that focuses on actual interaction with an application, frequency of use, and recency of use. Accordingly, the usage information that is generated as each user device 212 accesses a purchasable application can be tracked centrally, in part via the usage database 318. The usage information of each purchasable application can be displayed to indicate the purchasable applications that are most frequently accessed and which individuals, divisions, or other virtual groups are accessing the purchasable applications. Accordingly, each administrator, administrator A 306 and administrator B 308 can detect if multiple user devices 212 or members of a particular division of an organization are using a new purchasable application frequently. In an example, each administrator, administrator A 306 and administrator B 308 can also detect if the frequency of accessing a purchasable application decreases over time. For example, each administrator, administrator A 306 and administrator B 308, can detect if a purchasable application has not been accessed for a period of time following. An administrator may not block launching and accessed applications but instead hide an icon allowing access, launching, or usage of the application from view in the storefront 210 to prevent the user from launching an expired trial application. In either example, both administrator, administrator A 306 and administrator B 308 can effectively manage purchasable applications based on information stored in the usage database 318.

Figure 4:
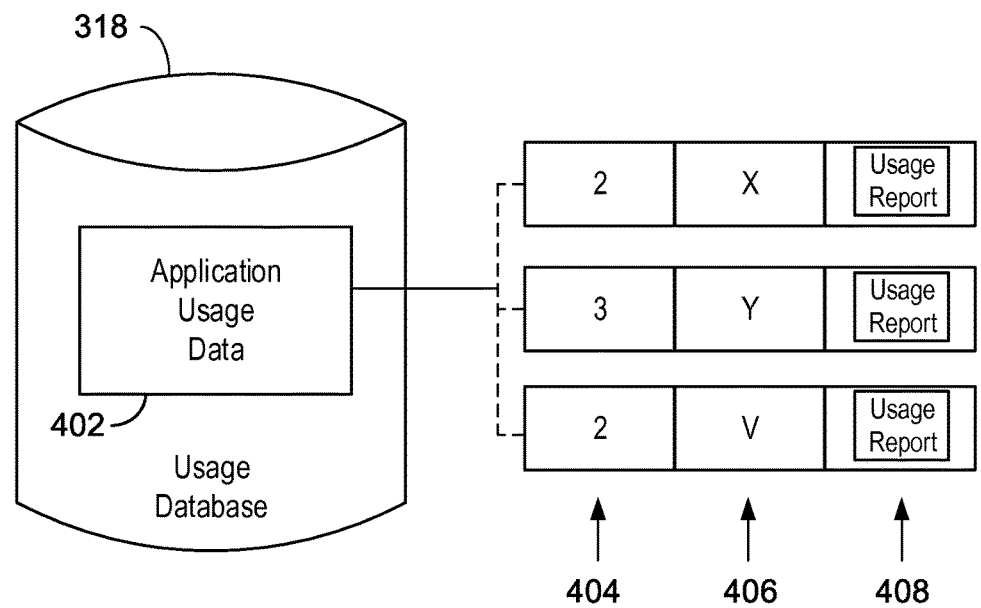
FIG. 4 is an example of generated application usage data from accessed, launched, or used applications.

FIG. 4 is an example of generated application usage data 402 from accessed, launched, or used applications. The example of FIG. 4 is generally referred to by the reference number 400. Like numbered items are as described in FIG. 3.

The usage database 318 can be used by either administrator, administrator A 306 or administrator B 308 to collect and organize application usage data from user devices 212, division 310-314, and applications. The application usage data 402 collected can include a number 210 of users who have accessed, launched, or otherwise used an application 404, a reference to application 406, and a usage report 408. While the application usage data 402 can collect data to include a number of users who have used an application 402, this data can often be presented in an aggregated way to an administrator, such as grouped by division, virtual team, job discipline, geographic location, or any other suitable grouping or pattern mechanism. This application usage data 402 can be grouped together to form a prioritized list of purchasable applications sortable by division, based on the number of user devices 212 who have used the application. In one example, the usage report 408 can indicate situations such as when an application is accessed, launched, or otherwise used by the most user devices 212, but the application is only accessed briefly after use. Accordingly, the usage report 408 can indicate when applications are to be blocked from access by a user device 212 based on any suitable predetermined conditions or thresholds.

Figure 5:
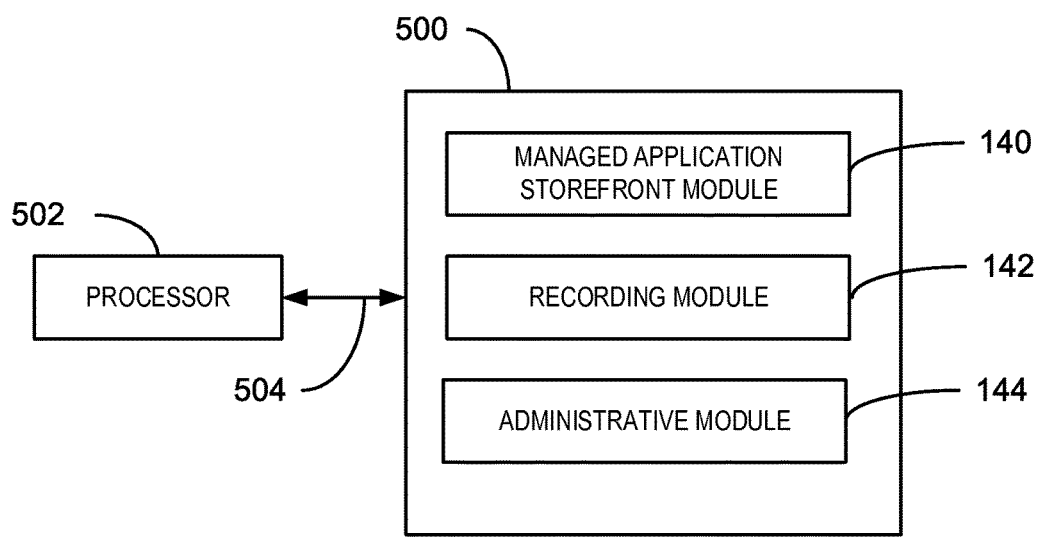
FIG. 5 shows an example computer-readable medium implementing application management as discussed herein.

FIG. 5 shows an example tangible, computer-readable storage medium implementing application management as discussed herein. The computer-readable storage media 500 can be accessed by a processor 502 over a computer bus 504.

Furthermore, the tangible, computer-readable storage media 500 can include code to direct the processor 502 to perform the current methods.

The various software components discussed herein can be stored on the tangible, computer-readable storage media 500, as indicated in FIG. 5. For example, the tangible computer-readable storage media 500 can include a management application storefront module 140, a recording module 142, and an administrative module 144.

The managed application storefront module 140 can return data for a subset of purchasable applications to users based on user information it receives. The user information can include a listing of the user computing environment and can be used to regulate the purchasable applications available for use, launching, or accessing. In one example, the listing of the computing environment can include hardware, software, or compatibility with other already used or active applications.

The recording module 142 can store usage information corresponding to managed application storefront accesses or use by the user device 212, the usage information can include user information, division information, and an application version of the purchasable application used by each user. The information recorded by the recording module 142 can include post-access purchasable application usage by user devices 212 who have accessed, launched, or used a purchasable application.

The administrative module 144 can regulate access of users to the purchasable application the user devices 212 have launched, accessed, or used based on information recorded by the recording module 142. The administrative module 144 can authorize centralized payment from a payment module of a store service 146 to a vendor 202 of the purchasable application 210 the user device is using, launching, or accessing based on the information recorded in the recording module 142. The centralized payment can provide access control by only allowing creation of a license based on payment for individual users, users within a specific division, or for all managed users by the administrative module 144. In this example, the creating of a license for an individual user enables access based on a license check performed each time the user device attempts to access and launch an application. In this example, the license can indicate if the user device has access to a paid experience or a trial experience.

The administrative module 144 can assign a power role to a user ID, to a particular user device 212, or division 310-314 to designate that particular entity having access and control privileges. A power role enables access control for applications over a number of users or divisions. A user with a power role can send a full access command to the administrative module 144, the administrative module 144 to allow access to an application for a user device 212 or Division 1 310 as designated by the access commanded.

The administrative module 144 using usage data as recorded by the recording module 142 can send, to each administrator, administrator A 306 and administrator B 308, a prioritized list of purchasable applications sortable by division, specific user, or by overall use of a particular application. The administrative module 144 can also send information including a number of accesses, or launches for each particular application, trial versions being used both over all the users managed, and by divisional grouping. The administrative module 144 can also set an access limit for each administrator, administrator A 306 and administrator B 308 or user with a power role to spend within the division or users they manage. The administrative module 144 can also instruct the managed application storefront module to present to the user device 212 recommended applications to user devices 212 based on information from the recording module 142, such as the frequency other user devices 212 in their Division 1 310 have accessed, launched or used a particular purchasable application.

It is to be understood that any number of additional software components not shown in FIG. 5 can be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Figure 6:
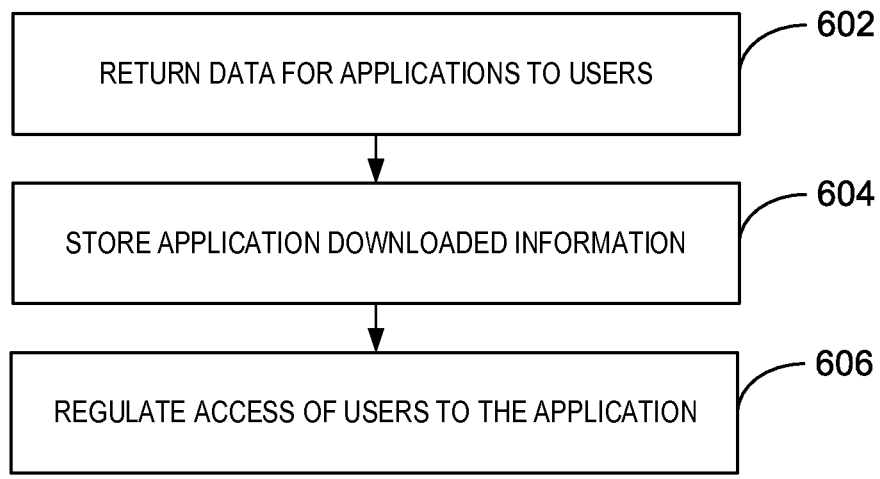
FIG. 6 shows a process flow diagram of an example method for managing applications.

FIG. 6 shows a process flow diagram of an example method for managing applications. The example method of FIG. 6 is generally referred to by the reference number 600 and discussed with reference to FIG. 1.

In one example, the process flow diagram indicates that the blocks of the method 600 execute in a particular order. However, the blocks of method 600 can be executed in any particular order in other examples. Furthermore, in some examples, any number of the block of method 600 can be included. Further, any number of additional blocks not shown may be included within the method 600, depending on the details of the specific implementation.

The method begins at block 602, wherein a listing service 148 that feeds data to the managed application storefront module 140 for filtering of the application presents this filtered list to user devices 212. In an example, this data is in the form of hyperlinks or metadata that can include text and images that can include a button for accessing an application. These buttons can include access to free applications, access to start a trial, and or that lead to a purchase module or other means of accessing a purchasable application 210 or the data can include the applications themselves. The purchasable applications 210 can be submitted by a third party developer if they present proper certification or permissions to gain access to the database 206. The selection of purchasable applications presented to the user device 212 via the storefront provided by the managed application storefront module 140 can be altered based on detected user information, which can be detected directly from the user or from previously stored user information from the recording module 142. In another example, stored a storefront can be altered based on previously recorded decisions that the IT department for an organization have made, e.g. they don't approve vendors A, B and C, or a broad category of application, e.g. 'games.'

The method proceeds at block 604, when usage information is received at a recording module 142 from the licensing service 148. The licensing information can include any information about the accessing process itself including the user device 212 performing the access, the purchasable application being accessed, the license of the application, e.g. trial vs. full version vs. expired, etc. The recording module can receive and record this license during one of three acquisition flows. The received and recorded license information is originally separate from the recording module and the application management system and only stored so long as the application management system requires that information. In one example, the user can click add an add button, a try button, or a free trial button respectively. If a user clicks buy, the user must go through a purchase module before a paid license is written by a licensing service 148, stored in a licensing service 148 and transmitted to an application management module as needed. In other example, only an administrator can actually purchase an application. From an administrative panel, a managed application storefront module 140 can provide a user with a list of applications for which they have a license. In an example, this list can be generated by the licensing service 148.

The method proceeds at block 606, where an administrative module 144 regulates access of users to the application through restriction or granting of access. This access restriction can include preventing launch on user devices to access of user devices to a purchasable application or limiting access to purchasable applications in some examples. In other embodiments, an administrative module 144 can restrict billing information, which can result in restricted access to a purchasable application. In an example, an administrative module 144 receives usage data from the recording module 142 for a particular user or divisions of a purchasable application. Based on this information, a user with a power role, or either administrator, administrator A 306 or administrator B 308 can execute a centralized access order to be sent to the vendor, or another purchasable application distributor in exchange for a desired number of licenses to the purchasable application. Alternatively, if the administrative module 144 detects a decrease in user device 212 access to a particular vendor's previously purchased application, the administrative module 144 can restrict billing information for a vendor for licenses thereby deactivating the licenses and removing access to the purchasable application accessed by the user device 212.

Example 1

In one embodiment, an application management system can include a managed application storefront module to return an access mechanism for a subset of purchasable applications to a storefront based on user information. An example system can also include a recording module to store usage information for the subset of purchasable applications accessed from the storefront. The usage information can include the user information, division information, and an application version for each of the subset of purchasable applications accessed by the user. Another example system can include an administrative module to restrict access of the user, based on information recorded by the recording module, to a purchasable application of the subset of purchasable applications accessed by the user.

Additionally, the administrative module is to assign a license to a vendor of the purchasable application based on the information recorded in the recording module. Alternatively, or in addition, the administrative module is to assign a license to allow user access for a second user with different divisional information. Alternatively, or in addition, the system can also include an administrative module that is to adjust settings of the storefront to remove from display purchasable applications that do not meet divisional compliance. Additionally, the user information includes a user computing environment to restrict an access mechanism returned to the storefront based on compatibility of the subset of purchasable applications with the user computing environment. Additionally, a system can also include a storefront to provide a trial version of a purchasable application to the user if a full version purchasable application has not been accessed, the recording module to record that the user accessed a trial version. Additionally, the administrative model is to assign a power role to the user to enable control over a division or an entire organization. Alternatively, or in addition, an administrative module can receiving an access control request from a user with the power role, the access control request to provide access for the purchasable application to the organization. Additionally, the system can also include usage information that is recorded by the recording module includes post-access purchasable application usage by users, as well as the administrative module is to send, to a user with the power role, a prioritized list of purchasable applications sortable by division, user information. Additionally, the user information can include a number of accesses for each particular purchasable application, a number of trial versions being used for each purchasable application, and a frequency of usage of each purchasable application. Additionally, the administrative module is to designate an access limit to an organization, the access limit to designate a maximum number of unique purchasable applications can be accessed by an organization or a particular division. Alternatively, or in addition, the administrative module is to suggest frequently accessed purchasable applications through the storefront based on the user information and usage information recorded by the recording module.

Example 2

The present disclosure also describes a method for application management including returning data for a subset of purchasable applications to a storefront based on user information. Additionally, a method further includes storing usage information, with a recording module, corresponding to the subset of purchasable applications accessed from the storefront, the usage information including the user information, organization or division information, and an application version for each of the subset of purchasable applications accessed by the user. Alternatively, or in addition, the example method includes authorizing, with the administrative module, an administrative module payment to a vendor of the purchasable application the user accessed based on the information recorded in the recording module. Additionally, in an example, the administrative module is to assign a license for a second user with different divisional information. Additionally, another example includes adjusting, with the administrative module, settings of the storefront to remove from display purchasable applications that do not meet organization compliance. Alternatively, or in addition, the example method, the user information includes a user computing environment to restrict the access mechanism returned to the storefront based on compatibility of the subset of purchasable applications with the user computing environment. Alternatively, or in addition, another example method includes providing, through the storefront, a trial version accessed of a purchasable application to the user if a full version purchasable application has not been accessed, the recording module to record that the user accessed a trial version.

Example 3

The present disclosure also describes computer-readable memory storage device to return data for a subset of purchasable applications to a storefront based on user information. Alternatively, or in addition, the computer-readable memory storage device further includes storing usage information, with a recording module, corresponding to the subset of purchasable applications accessed from the storefront, the usage information including the user information, organization or divisional information, and an application version for each of the subset of purchasable applications accessed by the user. Additionally, the computer-readable memory storage device can regulate access to applications based on information recorded by the recording module, the access regulated by the administrative module no longer returning an access mechanism for the purchasable application to the storefront.

Alternatively, or in addition, the one or more computer-readable memory storage devices can include an administrative model to assign a power role to the user to enable control over an organization or particular division. Alternatively, or in addition, the usage information recorded by the recording module includes post-access purchasable application usage by users. Additionally, in another version of the computer-readable medium, the administrative module is to send, to a user with the power role, a prioritized list of purchasable applications sortable by division, user information. Additionally, the administrative module can send a number of accesses, launches, or amount of usage for each particular purchasable application, a number of trial versions being used for each purchasable application, and a frequency of usage of each purchasable application.

The disclosure further regards a computer-readable storage medium or device for application management that will return, with a managed application storefront module, an access mechanism to a storefront based on user information, the access mechanism to indicate the location of data for a subset of purchasable applications. The computer-readable medium can also store usage information, with a recording module, accesses from the storefront, the usage information including the user information, divisional information, and an application version of each of the subset of purchasable applications access by the user. The computer-readable medium can also regulate access, with an administrative module, to a purchasable application of the subset of purchasable applications based on information recorded by the recording module, the access regulated by the administrative module no longer returning an access mechanism for the purchasable application to the storefront.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, restrictions, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or accessible software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for providing access to licensed resources comprising:
 a processor to:
  return data to display a prioritized list of purchasable applications based on user information, usage information, and divisional information that identifies a common division associated with the purchasable applications;
  regulate access to a designated application selected from the prioritized list of purchasable applications for users associated with the common division, wherein access is regulated using the usage information of each purchasable application for the common division; and
  block access to the designated application for the users of the common division in response to low usage of the designated application as identified from the usage information.

2. The system of claim 1, wherein the processor is to assign a license to a user of the purchasable application based on purchase information recorded in a recording module received from a user.

3. The system of claim 2, wherein the processor is to assign a license for a second user with different divisional information.

4. The system of claim 1, wherein the processor is to adjust settings to remove from display each purchasable application of a subset of purchasable applications that does not meet organization compliance.

5. The system of claim 1, wherein the user information comprises a user computing environment to restrict an access mechanism returned based on compatibility of a subset of purchasable applications with the user computing environment.

6. The system of claim 1, wherein the processor provides a trial version access mechanism of the purchasable application to a user if a full version of the purchasable application has not been accessed, the processor to record that the user accesses a trial version.

7. The system of claim 1, wherein the processor is to assign a power role to a user to enable control over an organization.

8. The system of claim 7, wherein the processor receives an access control request from a user with the power role, the access control request to provide access for the purchasable application to a particular division of the organization.

9. The system of claim 7, wherein:
the usage information recorded by the processor comprises post-access purchasable application usage by users; and
the processor is to send, to a user with the power role, a prioritized list of a subset of purchasable applications ranked using data including division, user information, comprising the usage information for each purchasable application, a number of trial versions being used for each purchasable application, and a frequency of usage of each purchasable application.

10. The system of claim 1, wherein a subset of purchasable applications has no initial purchase cost.

11. The system of claim 1, wherein the processor is to suggest frequently used purchasable applications of a subset of purchasable applications based on the user information and usage information recorded by the processor.

12. The system of claim 1, wherein multiple divisions can be assigned formal application access limits and application access can be approved automatically with certain settings by the administrator.

13. The system of claim 1, wherein an administrative module notifies a user that an application is noncompliant with divisional guidelines.

14. A method for providing access to licensed resources, the method comprising:
returning data for a prioritized list of purchasable applications based on user information, usage information, and divisional information that identifies a common division associated with the purchasable applications;
restricting access, with the processor, to a designated application selected from the prioritized list of purchasable applications for users associated with the common division, wherein access is regulated using the usage information of each purchasable application for the common division; and
blocking access to the designated application for the users of the common division in response to low usage of the designated application as identified from the usage information.

15. The method of claim 14, comprising authorizing, with the processor, a centralized payment to a vendor of the application a user accessed based on the information recorded in a recording module.

16. The method of claim 15, wherein centralized payment is to assign a license for a second user with different divisional information.

17. The method of claim 14, comprising adjusting, with the processor, settings to remove from display purchasable applications of a subset of purchasable applications that do not meet organization compliance.

18. The method of claim 14, wherein the user information comprises a user computing environment to restrict an access mechanism returned based on compatibility of a subset of purchasable applications with the user computing environment.

19. The method of claim 14, comprising providing a trial version accessed of the application to a user if a full version of the application has not been accessed, the processor to record that the user accessed a trial version.

20. One or more computer-readable memory storage devices for storing computer readable instructions that, when executed by one or more processing devices, provides access to licensed resources, the computer-readable instructions comprising code to:
return, with a processor, a prioritized list of purchasable applications based on user information, usage information, and divisional information that identifies a common division associated with the purchasable applications;
regulate access, with the processor, to a designated application selected from the prioritized list of purchasable applications for users associated with the common division, wherein access is regulated using the usage information of each purchasable application for the common division; and
block access to the designated application for the users of the common division in response to low usage of the designated application as identified from the usage information.

21. The one or more computer-readable memory storage devices of claim 20, wherein the processor is to assign a power role to a user to enable control over an organization.

22. The one or more computer-readable memory storage devices of claim 21, wherein:
the usage information recorded by the processor comprises post-access purchasable application usage by users; and
the processor is to send, to a user with the power role, a prioritized list of a subset of purchasable applications sortable by division, user information, comprising usage information for each purchasable application, a number of trial versions being used for each purchasable application, and a frequency of usage of each purchasable application.

* * * * *